(12) United States Patent
Kawahara

(10) Patent No.: US 12,321,194 B2
(45) Date of Patent: Jun. 3, 2025

(54) HEAD MOUNTED DISPLAY WITH FLIP-UP DISPLAY DEVICE

(71) Applicant: CANON KABUSHIKI KAISHA, Tokyo (JP)

(72) Inventor: Hitoshi Kawahara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/475,038

(22) Filed: Sep. 26, 2023

(65) Prior Publication Data
US 2024/0111332 A1    Apr. 4, 2024

(30) Foreign Application Priority Data
Sep. 29, 2022   (JP) .................................. 2022-156498

(51) Int. Cl.
*G06F 1/16* (2006.01)
*G06F 1/3218* (2019.01)
*G06F 3/01* (2006.01)
*G09G 3/00* (2006.01)

(52) U.S. Cl.
CPC ............ *G06F 1/163* (2013.01); *G06F 1/3218* (2013.01); *G06F 3/012* (2013.01); *G09G 3/001* (2013.01); *G09G 2330/022* (2013.01); *G09G 2330/023* (2013.01); *G09G 2354/00* (2013.01)

(58) Field of Classification Search
CPC .......... G06F 1/163; G06F 3/012; G06F 3/147; G06F 1/3218; G09G 3/001; G09G 2330/022; G09G 2330/023; G09G 2354/00
See application file for complete search history.

(56) References Cited

U.S. PATENT DOCUMENTS

| | | | |
|---|---|---|---|
| 10,636,217 B2* | 4/2020 | Osman | G06T 13/40 |
| 11,037,519 B2 | 6/2021 | Nishizawa | |
| 11,262,839 B2 | 3/2022 | Young et al. | |
| 2018/0096533 A1* | 4/2018 | Osman | G06T 17/10 |
| 2019/0354173 A1* | 11/2019 | Young | G06F 3/012 |
| 2021/0318850 A1* | 10/2021 | Thomas | G06V 40/171 |

FOREIGN PATENT DOCUMENTS

| | | | | | |
|---|---|---|---|---|---|
| JP | 2001211403 A | | 8/2001 | | |
| JP | 2009027489 A | | 2/2009 | | |
| JP | 2021114756 A | * | 8/2021 | | |
| JP | 2024049960 A | * | 4/2024 | | G06F 1/163 |
| WO | WO-2017177122 A1 | * | 10/2017 | | G02B 17/086 |

\* cited by examiner

*Primary Examiner* — Julie Anne Watko

(74) *Attorney, Agent, or Firm* — Canon U.S.A., Inc. IP Division

(57) ABSTRACT

A head mounted display includes a head mounted device configured to be mounted on a head of an observer, and a display device configured to be supported by the head mounted device so as to be capable of being flipped up, wherein the display device includes an observation optical system that guides light to an eye of the observer, and a detection unit that detects proximity of the display device to a face of the observer, and wherein the detection unit is disposed so that a center line of a detection range of the detection unit is directed downward with respect to an optical axis direction of the observation optical system.

8 Claims, 9 Drawing Sheets

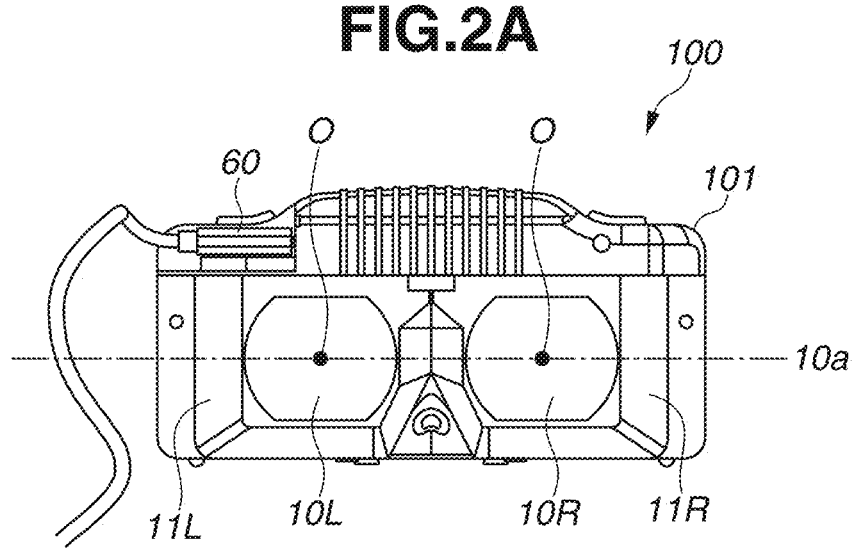
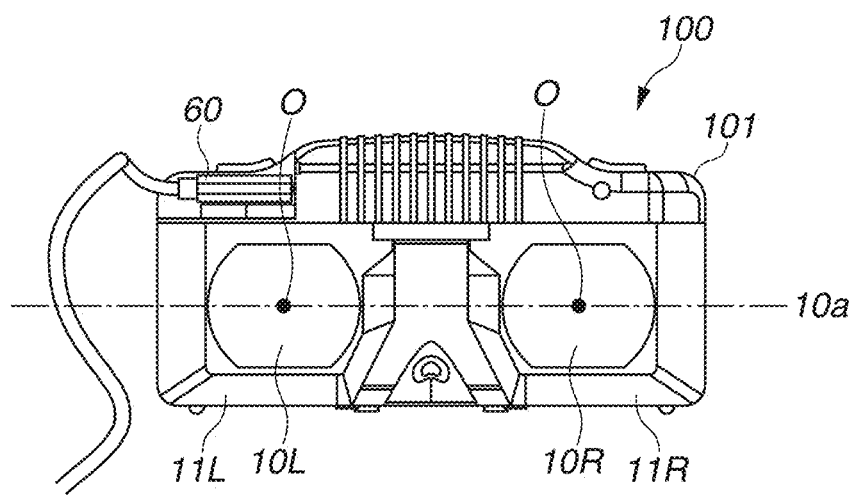

HEAD MOUNTED DISPLAY WITH FLIP-UP DISPLAY DEVICE

BACKGROUND OF THE DISCLOSURE

Field of the Disclosure

The present disclosure relates to a head mounted display in which a display device can be flipped up.

Description of the Related Art

In recent years, a head mounted display (HMD) that is worn on the head of an observer and displays a video in front of the observer's eyes has been increasingly used. The HMD is used as a device capable of providing experience of artificial reality (virtual reality (VR)) and mixed reality (MR) for the reasons that it is possible to easily view a video on a large screen and that stereoscopic viewing is easy.

The HMD for implementing MR includes an imaging unit for capturing images of a subject corresponding to the left and right eyes of the observer, a display unit for displaying a three-dimensional (3D) computer graphics (CG) image superimposed on each of the images captured by the imaging unit, and an observation optical system for projecting an image to the observer. The image is displayed on a display element, such as a small-sized liquid crystal panel, for each of the left and right eyes of the observer, and the image is magnified through an observation optical system for each of the left and right eyes of the observer and then projected onto each of the left and right eyeballs of the observer. The images captured by the imaging unit are images having parallax corresponding to the left and right eyes. Then, 3D CG images are created as parallax images corresponding to the left and right eyes of the observer, and are displayed so as to be superimposed on the images captured by the imaging unit, whereby it is possible to express a virtual 3D CG image as if it actually exists.

The HMD is provided with a proximity sensor that detects proximity of the HMD to the face of the observer, so that the HMD can detect whether the observer is observing the display unit. Power consumption of the HMD can be suppressed by switching between an operation state and a non-operation state of each device based on a detection result of the proximity sensor.

Japanese Patent Application Laid-Open No. 2009-27489 discusses a configuration of a device that is mounted on a head and outputs a video, and includes a light emitting unit provided in the vicinity of one ear and a light receiving unit provided in the vicinity of the other ear capable of receiving light from the light emitting unit to determine whether the device is mounted on the head.

However, with the configuration discussed in Japanese Patent Application Laid-Open No. 2009-27489, in the case of an HMD including a flip-up mechanism provided to allow the observer to directly view the surroundings without removing the HMD from the head, it is not possible to detect that the observer is not observing the display unit when the flip-up mechanism is flipped up.

SUMMARY OF THE DISCLOSURE

According to an aspect of the present disclosure, a head mounted display includes a head mounted device configured to be mounted on a head of an observer, and a display device configured to be supported by the head mounted device so as to be capable of being flipped up, wherein the display device includes an observation optical system that guides light to an eye of the observer, and a detection unit that detects proximity of the display device to a face of the observer, and wherein the detection unit is disposed so that a center line of a detection range of the detection unit is directed downward with respect to an optical axis direction of the observation optical system.

Further features of the present disclosure will become apparent from the following description of exemplary embodiments with reference to the attached drawings.

BRIEF DESCRIPTION OF THE DRAWINGS

FIG. 2A is a diagram illustrating a rear surface of the display device according to the first exemplary embodiment.

FIG. 2B is a diagram illustrating the rear surface of the display device according to the first exemplary embodiment.

DESCRIPTION OF THE EMBODIMENTS

Exemplary embodiments of the present disclosure will now be described with reference to the accompanying drawings.

Figure 4:
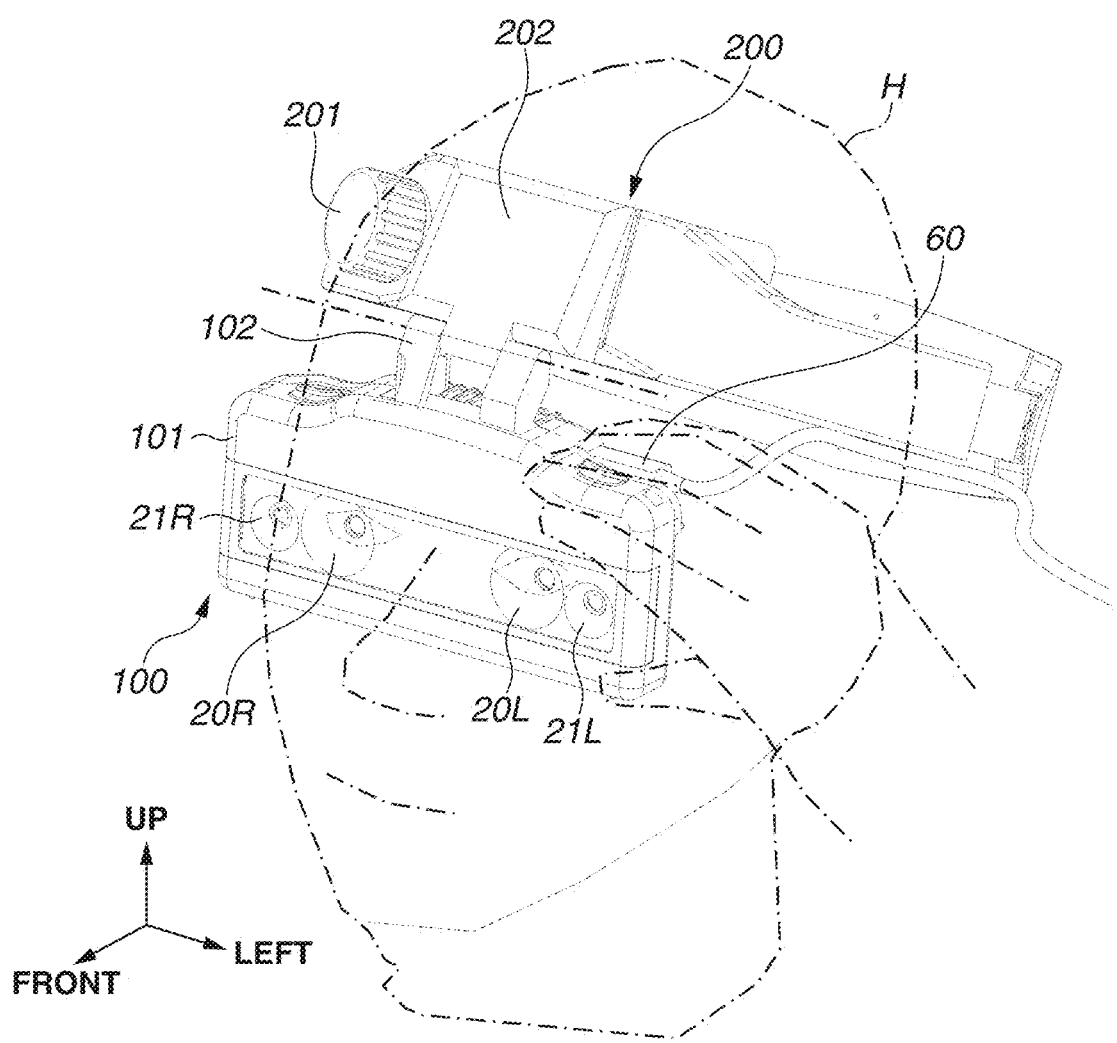
FIG. 4 is a perspective view illustrating a head mounted display (HMD) equipped with the display device according to the first exemplary embodiment.

As illustrated in FIG. 4, a display device 100 according to a first exemplary embodiment is a display device used for a head mounted display (HMD). In the present application, as illustrated in FIG. 4, a direction in which an observer faces is defined as a front side, and upward, downward, leftward, and rightward directions viewed from the observer are defined as the upward, downward, leftward, and rightward directions. In a description of each part of the display device 100, as illustrated in FIG. 4, the display device 100 will be described with reference to the upward, downward, leftward, and rightward directions in a state where the display device 100 is positioned in front of the eyes of the observer.

Figure 1A:
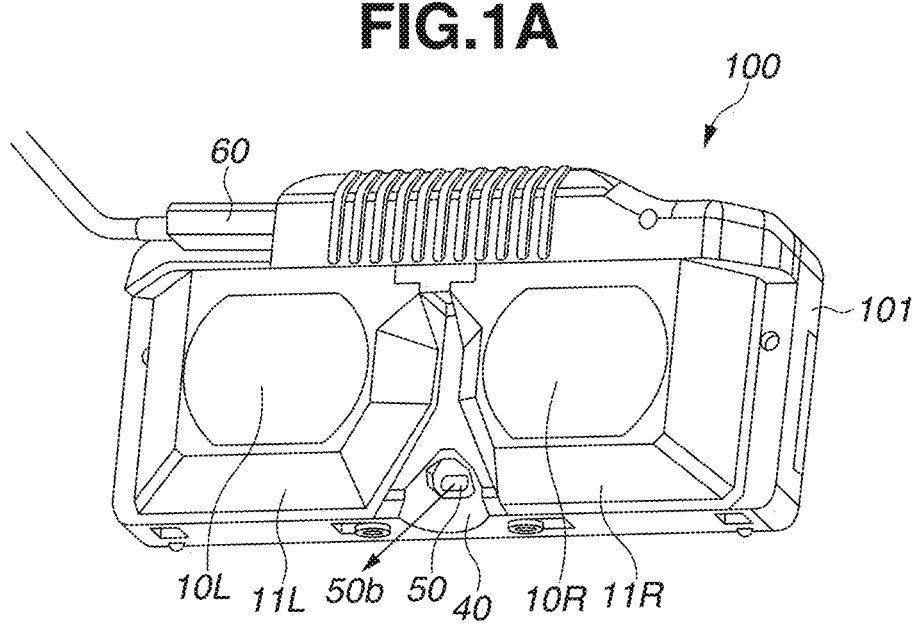
FIG. 1A is a perspective view of a display device according to a first exemplary embodiment viewed from the rear side (observer side).
Figure 1B:
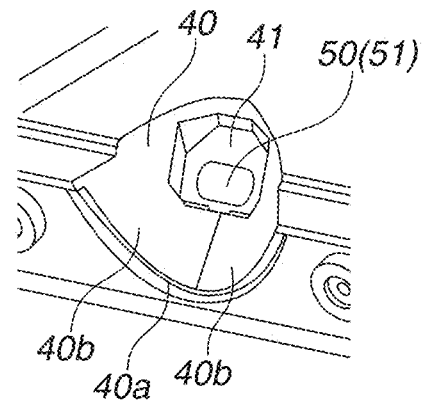
FIG. 1B is an enlarged perspective view of a part of the display device according to the first exemplary embodiment.
Figure 3:
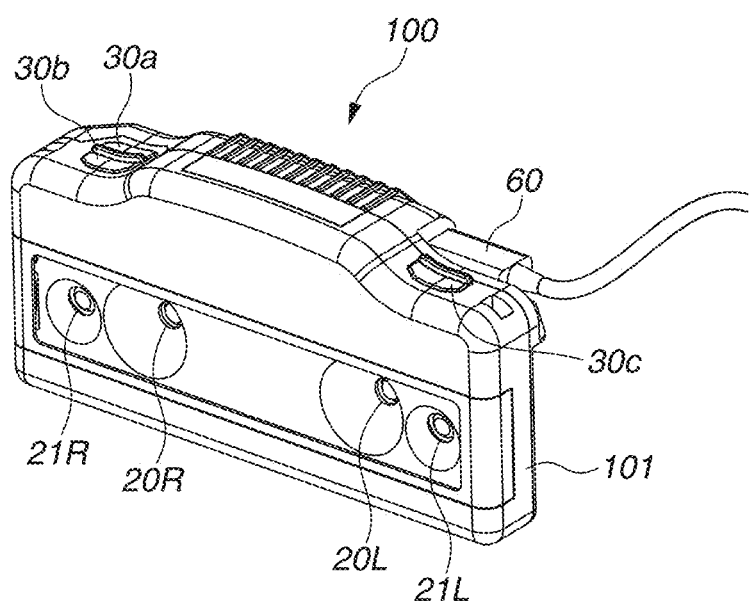
FIG. 3 is a perspective view illustrating the display device according to the first exemplary embodiment.

FIGS. 1A and 1B are diagrams illustrating the display device 100, and FIG. 1A is a perspective view of the display device 100 viewed from the rear side (observer side), and FIG. 1B is an enlarged perspective view of a part thereof. FIGS. 2A and 2B are diagrams illustrating a rear surface of the display device 100. FIG. 3 is a perspective view of the display device 100 viewed from the front side.

The display device 100 includes a housing 101 constituting an exterior thereof. The housing 101 is a horizontally long housing that is thin in a front-rear direction.

As illustrated in FIGS. 1A to 2B, left and right lenses 10L and 10R each constituting an observation optical system that guides light to the eyes of the observer are disposed on a rear surface of the housing 101. The lenses 10L and 10R are prisms, lenses, or the like that magnify and guide an image on a display unit (display panel), such as a liquid crystal display (LCD) or an organic light emitting diode (OLED), provided in the housing 101, and the observer observes the display unit by looking into the lenses 10L and 10R. Hoods 11L and 11R are provided around the lenses 10L and 10R, and as illustrated in FIGS. 2A and 2B, the observer can adjust the left-right positions of the lenses 10L and 10R to the interpupillary distance of the observer by operating the hoods 11L and 11R.

Inside the lenses 10L and 10R, there is arranged a line-of-sight detection unit including a line-of-sight sensor (not illustrated) and an infrared light emitting diode (IRED) (not illustrated). Information about the eye of the observer imaged by the line-of-sight sensor and reflected light of the IRED is processed by a signal processing board (not illustrated), so that the line of sight of the observer can be detected and a portion being gazed can be specified.

As illustrated in FIG. 3, a front surface of the housing 101 is provided with left and right imaging cameras 20L and 20R and left and right alignment cameras 21L and 21R. The imaging cameras 20L and 20R are stereo cameras that acquire real images to be displayed to the observer via the lenses 10L and 10R.

The alignment cameras 21L and 21R are stereo cameras for acquiring the position and orientation of the display device 100 using feature points, such as markers and edges of an object, extracted from acquired images. Although the alignment cameras 21L and 21R are monochrome cameras, the cameras are directed to high-precision and high-fault tolerance alignment using a wide angle of view, a high shutter speed, a long baseline length, etc.

In the present exemplary embodiment, the imaging cameras 20L and 20R and the alignment cameras 21L and 21R are separately provided. However, the display device 100 may be configured to perform acquisition of a display image and acquisition of alignment information by only the imaging cameras 20L and 20R. Further, each of the alignment cameras 21L and 21R may be replaced with a distance sensor using ultrasonic waves, infrared rays, or the like.

A cable 60 is connected to the left end of a top surface of the housing 101. The cable 60 is arranged so as to extend to a lateral side of the display device 100. The display device 100 communicates position information and image data with an external personal computer or controller via the cable 60, generates a display image in which a 3D CG image is superimposed on a real image, and displays the display image on the display unit, such as an LCD or an OLED. The observer can observe the display unit via the observation optical system.

On the top surface of the housing 101, operation buttons 30a to 30c for receiving an instruction operation, a power supply operation, and the like of the observer are arranged. The operation buttons 30a to 30c are arranged so that the observer can operate the operation buttons 30a to 30c while holding upper and lower sides of the housing 101. Accordingly, the observer can perform button operation with one hand while suppressing a positional deviation between the observation optical system and the observer caused by reaction of the operation when operating the operation button, which may occur in a case where the operation buttons are arranged on a side surface of the housing 101.

FIG. 4 is a perspective view illustrating an HMD using the display device 100. The display device 100 is supported so as to be suspended by a head mounted unit 200 which is a head mounted tool, whereby the observer can observe the display unit in a hands-free manner.

The head mounted unit 200 supports the display device 100 via a vertical movement portion 202.

Figure 5:
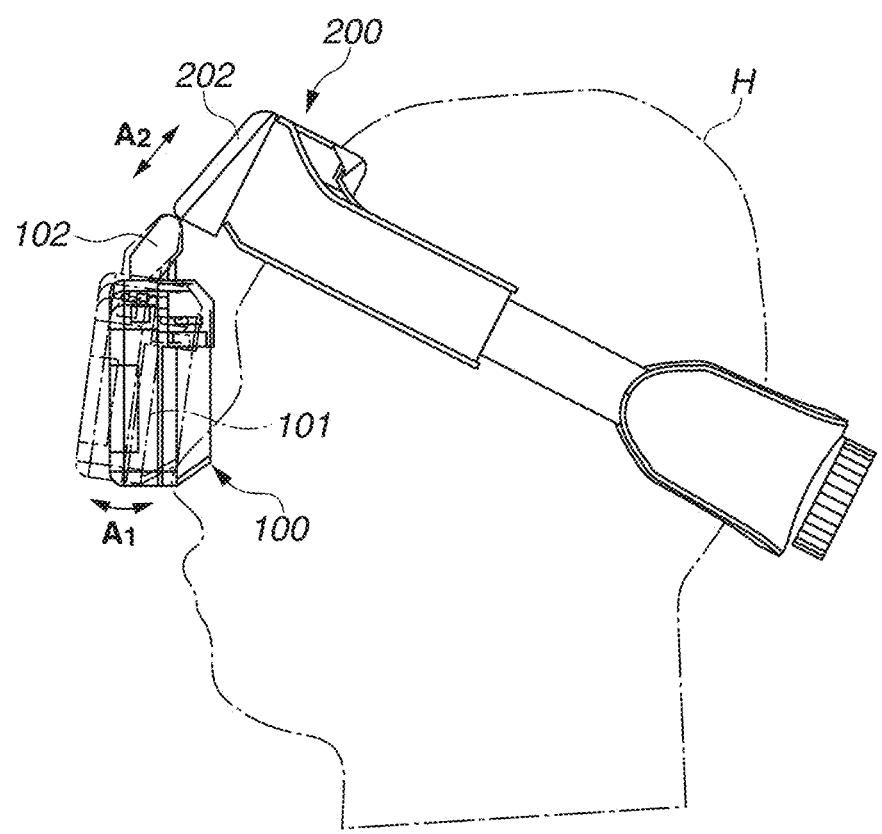
FIG. 5 is a perspective view illustrating the HMD equipped with the display device according to the first exemplary embodiment.

In the display device 100, a swing portion 102 provided on an upper portion thereof is supported by the vertical movement portion 202, and as illustrated in FIG. 5, the display device 100 can be swung back and forth (an arrow Ai). In addition, the display device 100 can be moved in the vertical direction (an arrow A 2) by operating a dial 201 mounted on the head mounted unit 200 by the vertical movement portion 202. Thus, the lenses 10L and 10R can be adjusted to optimum observation positions in combination with the above-described function of adjusting to the interpupillary distance.

Figure 6:
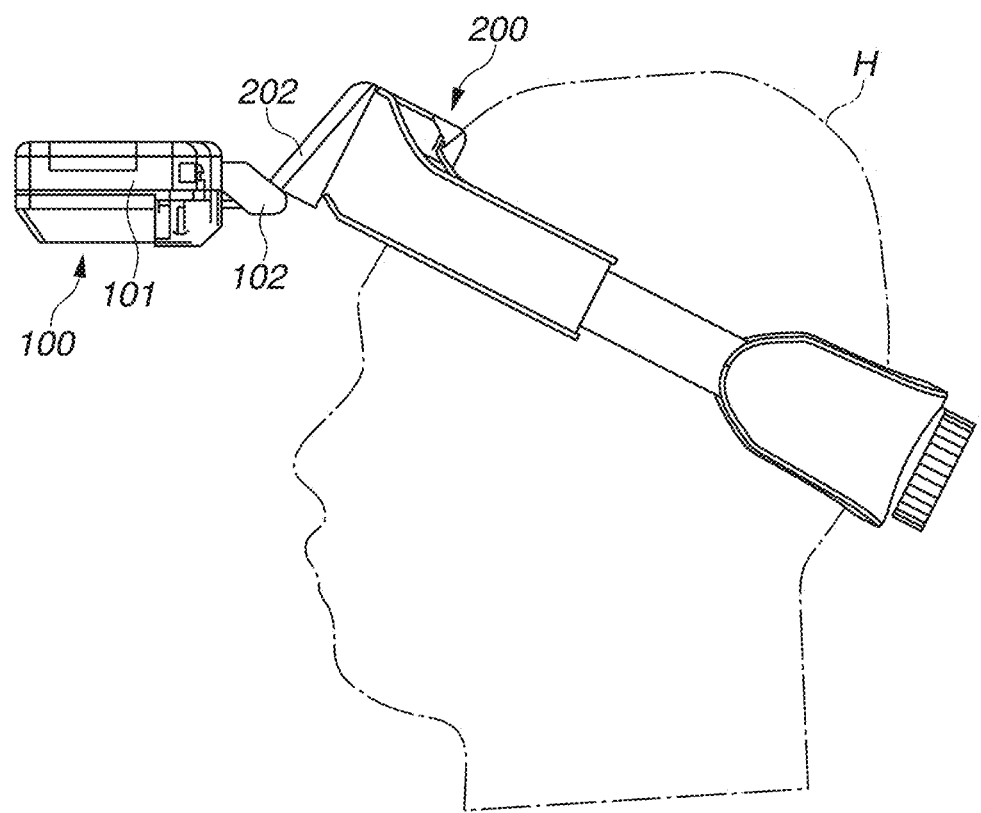
FIG. 6 is a perspective view illustrating the HMD equipped with the display device according to the first exemplary embodiment.

The head mounted unit 200 has a flip-up mechanism, and can swing the display device 100 to move the display device 100 to a flip-up position where the display device 100 is positioned substantially horizontally, as illustrated in FIG. 6. Thus, the observer can temporarily directly view the outside without removing the HMD from a head H. Since the cable 60 extends to the lateral side of the display device 100, the display device 100 can be flipped up without the cable 60 interfering with the head mounted unit 200.

Here, as illustrated in FIGS. 1A and 1B, a nose relief portion 40 for avoiding interference with the nose of the observer is formed in a lower portion of a center portion in the lateral direction of the housing 101. The nose relief portion 40 has a concave shape that is widened and deepened toward the lower portion and is opened (an opening portion 40a) to fit the shape of the nose. The nose relief portion 40 has a bilaterally symmetrical curved surface (concave surface) 40b.

The nose relief portion 40 is provided with a proximity sensor 50 serving as a detection unit that detects proximity of the display device 100 to the face of the observer. As illustrated in FIGS. 2A and 2B, the proximity sensor 50 is disposed below a height position 10a of an optical axis O of the observation optical system, and detects the nose of the observer.

The proximity sensor 50 detects its proximity to an object by radially projecting infrared light in a predetermined range and outputting the amount of received infrared light reflected and returned from the object. An output value of the proximity sensor 50 is transmitted to the signal processing board (not illustrated). The signal processing board is disposed above the height position 10a of the optical axis O of the observation optical system in the housing 101, and is connected to the proximity sensor 50 via a flexible substrate.

The signal processing board determines whether an object is in the proximity of the proximity sensor 50, by determining whether the output value of the proximity sensor 50 exceeds a predetermined threshold value. When the observer is looking into the lenses 10L and 10R, the amount of infrared light reflected from the observer's nose increases, so that it is detected that the observer's face is in the proximity of the proximity sensor 50 and the observer is looking into the lenses 10L and 10R. The power consumption of the display device 100 can be suppressed by switching between an operation state and a non-operation state of each device, such as a display unit such as an LCD or an OLED, based on a detection result. For example, when a control unit of the display device 100 determines that no object is in the proximity of the proximity sensor 50, the power consumption of the display device 100 can be reduced by turning off display of the display unit.

The nose relief portion 40 and the proximity sensor 50 will be described in further detail.

The proximity sensor 50 is arranged in an upper portion of the nose relief portion 40, i.e., in a narrow and shallow portion of the nose relief portion 40. A flat portion 41 is formed on the bottom of the upper portion of the nose relief portion 40 so as to be one step deeper, and a window 51 serving as a light projecting portion and a light receiving portion of the proximity sensor 50 is arranged on the flat portion 41. As described above, by providing a flat surface having the same height in a certain range around the proximity sensor 50, infrared light projected by the proximity sensor 50 is prevented from being reflected by the housing 101, so that erroneous detection does not occur.

Figure 7A:
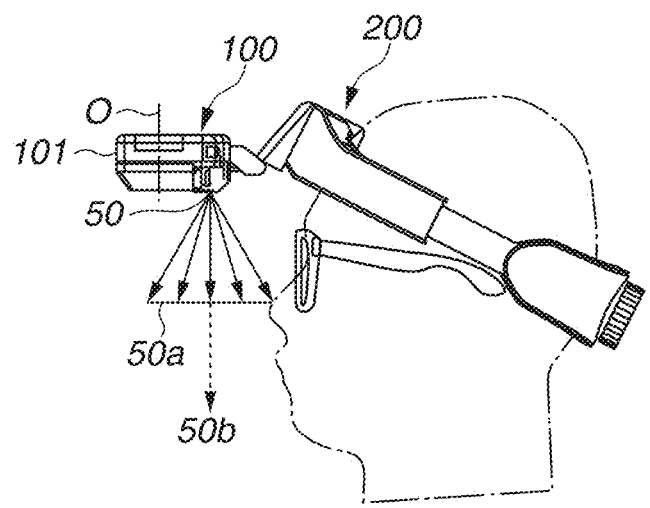
FIG. 7A is a diagram illustrating a light projection range of a proximity sensor in a state where the display device is raised to a flip-up position (comparative example).
Figure 7B:
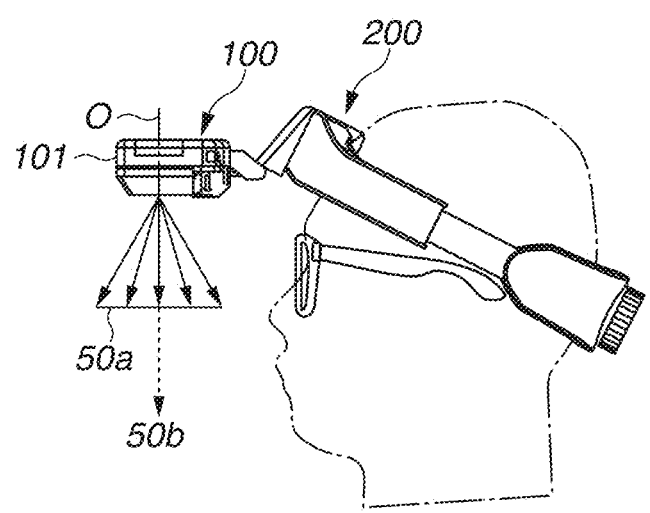
FIG. 7B is a diagram illustrating a light projection range of the proximity sensor in the state where the display device is raised to the flip-up position (comparative example).
Figure 7C:
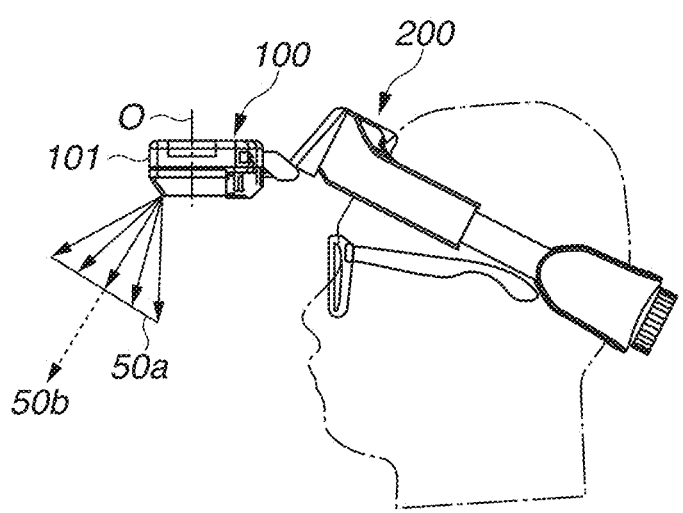
FIG. 7C is a diagram illustrating a light projection range of a proximity sensor in the state where the display device is raised to the flip-up position.

The proximity sensor 50 that radially projects infrared light is disposed along the concave shape of the nose relief portion 40, so that a center line 50b of a light projection range (detection range) 50a of the proximity sensor 50 faces downward with respect to an optical axis direction of the observation optical system, as illustrated in FIG. 1A and FIG. 7C described below. The optical axis direction is a direction in which the optical axis O extends and a direction parallel thereto. In the present exemplary embodiment, the center line 50b of the light projection range 50a is directed obliquely downward at about 45 degrees with respect to the optical axis direction. Specifically, it is desirable that the center line 50b is directed obliquely downward at an angle of more than 30 degrees and less than 60 degrees with respect to the optical axis direction.

In addition, it is desirable that the curved surface 40b of the nose relief portion 40 is set so that infrared light reflected from the nose of the observer is guided to the window 51 of the proximity sensor 50. For example, the concave shape of the nose relief portion 40 is formed into a shape of a part of a spheroid surface (a portion which becomes one quarter of a spheroid obtained by cutting the spheroid by a plane including the rotation center axis and a plane perpendicular to the plane and including the center). A spheroid surface has a characteristic that a light beam emitted from one focal point of the spheroid is reflected on the spheroid surface and converges on the other focal point. By disposing the proximity sensor 50 in the vicinity of the projected focal point on the bottom of the nose relief portion 40, the infrared light reflected from the nose is reflected on the curved surface 40b and easily returns to the window 51 of the proximity sensor 50. Although the shape is described as a spheroid surface, the shape may be a substantial spheroid surface close to the spheroid surface.

Next, actions and effects of the HMD according to the present exemplary embodiment will be described with reference to FIGS. 7A to 8C. Note that FIGS. 7A, 7B, 8A, and 8B are comparative examples with respect to the present exemplary embodiment, and components similar to those of the exemplary embodiment are denoted by the same reference signs for description.

FIGS. 7A to 7C are diagrams for describing the light projection range 50a of the proximity sensor 50 in a state where the display device 100 is raised to the flip-up position.

FIG. 7A illustrates, as the comparative example, an example in which the proximity sensor 50 is disposed above the height position 10a of the optical axis O of the observation optical system. In this example, the center line 50b of the light projection range 50a of the proximity sensor 50 is directed in the optical axis direction of the observation optical system. Thus, in the flip-up position, the center line 50b of the light projection range 50a of the proximity sensor 50 is directed substantially straight down. In this case, the light projection range 50a overlaps with the nose of the observer, and thus there is a possibility that the proximity sensor 50 erroneously detects that the observer is looking into the lenses 10L and 10R whereas the proximity sensor 50 should detect that the observer is not looking into the lenses 10L and 10R.

FIG. 7B illustrates, as the comparative example, an example in which the proximity sensor 50 is disposed near the height position 10a of the optical axis O of the observation optical system. In this example, the center line 50b of the light projection range 50a of the proximity sensor 50 is directed in the optical axis direction of the observation optical system. Also in this case, in the flip-up position, the center line 50b of the light projection range 50a of the proximity sensor 50 is directed substantially straight down, but the light projection range 50a is away from the nose of the observer, so that the possibility of erroneous detection can be reduced as compared with the comparative example of FIG. 7A.

FIG. 7C illustrates the present exemplary embodiment. The center line 50b of the light projection range 50a of the proximity sensor 50 is directed downward with respect to the optical axis direction of the observation optical system (directed obliquely downward at about 45 degrees with respect to the optical axis direction). Thus, in the flip-up position, the center line 50b of the light projection range 50a of the proximity sensor 50 is directed in a direction opposite to the face of the observer. In this case, since the light projection range 50a is far away from the nose of the observer, the possibility of erroneous detection can be greatly reduced.

Figure 8A:
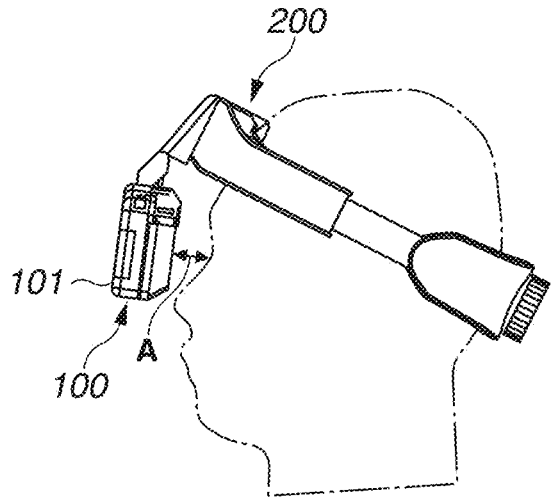
FIG. 8A is a diagram for explaining an influence when an observer wears glasses.
Figure 8B:
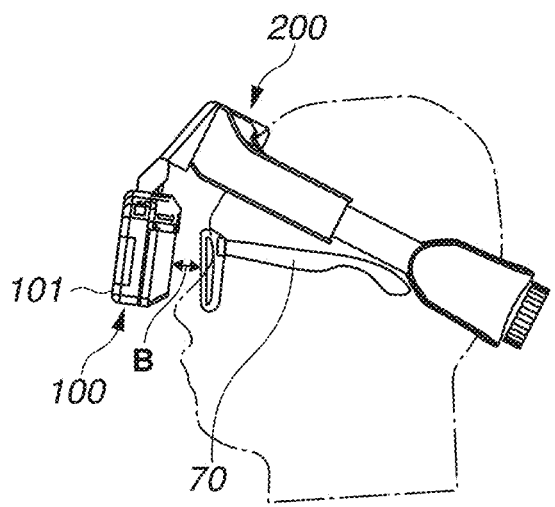
FIG. 8B is a diagram for explaining the influence when the observer wears glasses.
Figure 8C:
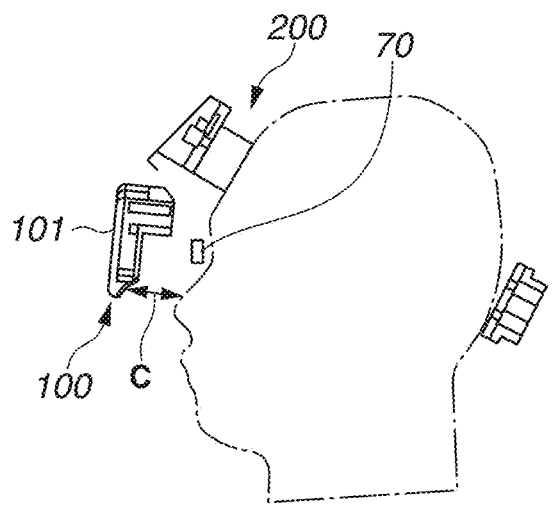
FIG. 8C is a diagram for explaining the influence when the observer wears glasses.

FIGS. 8A to 8C are diagrams for explaining an influence when the observer wears glasses 70.

FIGS. 8A and 8B illustrate, as the comparative examples, examples in which the proximity sensor 50 is disposed near the height position 10a of the optical axis O of the observation optical system. FIG. 8A illustrates a state in which the observer is not wearing glasses, and FIG. 8B illustrates a state in which the observer is wearing the glasses 70. FIGS. 8A and 8B illustrate threshold states at which the entire image on the display unit can be observed through the lenses 10L and 10R. Switching the detection of proximity by the proximity sensor 50 in this state is most effective in reducing power consumption. When the proximity sensor 50 is disposed near the height position 10a as illustrated in FIGS. 8A and 8B, a distance between the proximity sensor 50 and the face of the observer (including the glasses 70) changes depending on whether the observer wears the glasses 70 as indicated by a distance A in FIG. 8A and a distance B in FIG. 8B, and a detection timing of the proximity sensor 50 is varied.

FIG. 8C illustrates the present exemplary embodiment. In FIG. 8C, the HMD and the glasses 70 are illustrated in cross section. Similarly to FIGS. 8A and 8B, FIG. 8C illustrates a threshold state at which the entire image on the display unit can be observed through the lenses 10L and 10R. Since the proximity sensor 50 detects the nose of the observer, a distance C between the proximity sensor 50 and the nose does not change regardless of whether or not the observer wears the glasses 70, and the detection timing of the proximity sensor 50 is not varied.

In the present exemplary embodiment, since the proximity sensor 50 detects the nose of the observer, the proximity sensor 50 does not project infrared light in the direction of the eyes of the observer. Therefore, the infrared light of the proximity sensor 50 does not enter the line-of-sight sensor of the line-of-sight detection unit, and does not affect the performance of the line-of-sight detection unit.

As described above, in the HMD in which the display device 100 is swingably supported by the head mounted unit 200, when proximity between the display device 100 and the face of the observer is detected, it is possible to prevent erroneous detection and to prevent occurrence of variations in detection timing.

A second exemplary embodiment will now be described with reference to FIGS. 9A to 9C. As compared with the first exemplary embodiment, the second exemplary embodiment is an example in which the nose relief portion 40 is provided with a reflecting portion 42 that reflects infrared light projected by the proximity sensor 50 and reflected from the nose of the observer toward the proximity sensor 50. Hereinafter, components identical to those of the first exemplary embodiment are denoted by the same reference numerals, and description thereof will be omitted. Differences from the first exemplary embodiment will be mainly described.

Figure 9A:
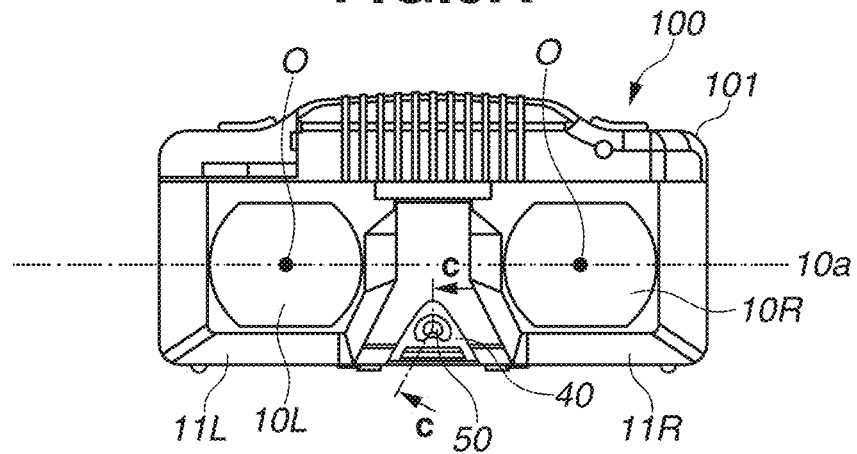
FIG. 9A is a diagram illustrating a rear surface of a display device according to a second exemplary embodiment.
Figure 9B:
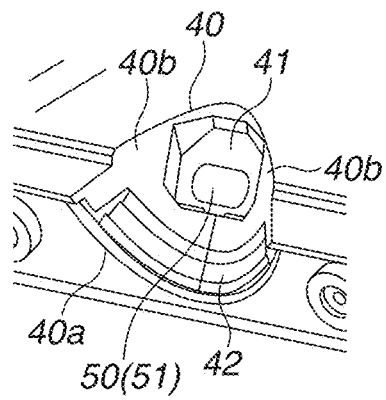
FIG. 9B is an enlarged perspective view of a part of the display device according to the second exemplary embodiment.
Figure 9C:
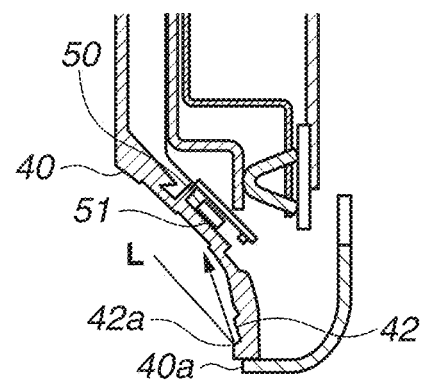
FIG. 9C is a cross-sectional view of the display device according to the second exemplary embodiment.

FIGS. 9A to 9C are diagrams illustrating a display device 100. FIG. 9A is a diagram illustrating a rear surface of the display device 100, FIG. 9B is a partially enlarged perspective view, and FIG. 9C is a cross-sectional view taken along line c-c in FIG. 9A.

When the nose of the observer is a detection target of the proximity sensor 50, the detection target is not a flat surface, but an inclined surface with respect to a light projection direction of the proximity sensor 50. Thus, a part of the infrared light projected onto the nose is reflected in a direction different from the direction in which the light returns to the proximity sensor 50. Therefore, it is desirable to efficiently guide the infrared light reflected from the nose to the proximity sensor 50.

In the present exemplary embodiment, as illustrated in FIGS. 9B and 9C, a lower portion of the nose relief portion 40 is formed with a concave surface that functions as the reflecting portion 42. On the concave surface, there is formed a reflection surface 42a that is arranged in an arc shape with the window 51 of the proximity sensor 50 as a substantial center and reflects infrared light in a direction of the window 51. Thus, as indicated by an arrow L in FIG. 9C, the infrared light reflected from the nose is reflected on the reflection surface 42a and returns to the window 51 of the proximity sensor 50, and the infrared light reflected from the nose can be efficiently guided to the proximity sensor 50.

While the present disclosure has been described above together with the exemplary embodiments, the exemplary embodiments are merely examples of embodiments for carrying out the present disclosure, and the technical scope of the present disclosure should not be interpreted as being limited by the exemplary embodiments. Specifically, the present disclosure can be implemented in various forms without departing from the technical idea or the main features thereof.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-156498, filed Sep. 29, 2022, which is hereby incorporated by reference herein in its entirety.

What is claimed is:

1. A head mounted display comprising:
   a head mounted device configured to be mounted on a head of an observer; and
   a display device configured to be supported by the head mounted device so as to be capable of being flipped up,
   wherein the display device includes an observation optical system that guides light to an eye of the observer, a housing provided with a nose relief portion to avoid interference with a nose of the observer, and a detection unit provided in the nose relief portion and configured to detect proximity of the display device to a face of the observer,
   wherein the detection unit performs detection of the proximity by projecting infrared light and receiving the infrared light reflected by the face, and
   wherein the nose relief portion includes a reflection portion that reflects the infrared light.

2. The head mounted display according to claim 1, wherein the detection unit is disposed below an optical axis of the observation optical system.

3. The head mounted display according to claim 1,
   wherein the nose relief portion has a concave shape that becomes wider and deeper toward a lower portion and opens, and
   wherein the detection unit is disposed on an upper portion of the nose relief portion.

4. The head mounted display according to claim 3, wherein the nose relief portion has a bilaterally symmetrical curved surface.

5. The head mounted display according to claim 1, wherein the reflection portion includes a part of a spheroid surface.

6. The head mounted display according to claim 1, wherein a detection range of the detection unit is a light projection range of the infrared light.

7. The head mounted display according to claim 1,
   wherein the display device includes a display unit, and
   wherein the observation optical system guides light from the display unit to the eye of the observer.

8. The head mounted display according to claim 1, further comprising a control unit configured to control an operation of a display unit based on a result of the detection performed by the detection unit.

* * * * *